(12) United States Patent
Patil (10) Patent No.: US 6,986,016 B2
(45) Date of Patent: Jan. 10, 2006

(54) CONTIGUOUS PHYSICAL MEMORY ALLOCATION

(75) Inventor: Manoj C. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 10/262,411

(22) Filed: Sep. 30, 2002

(65) Prior Publication Data

US 2004/0064671 A1   Apr. 1, 2004

(51) Int. Cl.
*G06F 12/00*   (2006.01)

(52) U.S. Cl. ...................................... 711/203; 711/170

(58) Field of Classification Search ............... 711/203, 711/209, 170; 707/200, 205

See application file for complete search history.

(56) References Cited

U.S. PATENT DOCUMENTS

| 5,987,582 A | * | 11/1999 | Devic ........................... 711/206 |
| 6,085,296 A | * | 7/2000 | Karkhanis et al. ........... 711/147 |
| 6,560,688 B1 | * | 5/2003 | Strongin et al. ............. 711/203 |
| 6,804,766 B1 | * | 10/2004 | Noel et al. ................... 711/203 |

* cited by examiner

*Primary Examiner*—Denise Tran
(74) *Attorney, Agent, or Firm*—Anthony V. S. England; T. Rao Coca (57) ABSTRACT

Providing physically contiguous memory from memory that is allocated without any guarantee of whether the underlying contiguous physical memory is contiguous involves identifying contiguous pages of physical memory in the allocated virtual memory. Such pages are contributed to a pool of contiguous physical memory for use as required. Any pages that are not contributed to the pool of contiguous physical memory, are not allocated with other pages that are contributed to the pool of contiguous physical memory, can be freed from allocation for alternative uses.

12 Claims, 11 Drawing Sheets

```
Algorithm    sort
Input        physical  (The array that holds physical addresses )
             virtual   (The array that holds virtual addresses )
             size      (No of elements in the array)
output       physical array sorted in ascending order
{
        /* Use any sorting technique to sort the first array elements in
           ascending order */
        /* Selection of sorting technique will be based on their individual merits/demerits*/
        /* While sorting care must be taken that the 1:1 correspondence
           between each element of first and second array is intact */
        /* Below is the code for one very simple sort */
        for(i=0; i < size; i++)
        {
                for (j = size - 1; j > i; j--)
                {
                        if (physical[j] < physical[j-1])
                        {
                          tmp          = physical[j] ;
                          physical[j]  = physical[j-1] ;
                          physical[j-1] = tmp ;
                          /* Maintain 1:1 correspondence */
                          tmp          = virtual[j] ;
                          virtual[j]   = virtual[j-1] ;
                          virtual[j-1] = tmp ;
                        }
                }
        }

| | |
|---|---|
| Algorithm | initialize_contiguous_mem_pool |
| Input | none |
| Output | none |

```
{
                                                       */
        Increase priority of the process /* since large amount of computation is involved malloc()  /* Allocate one chunk of several pages e.g 20000 pages */
        /* For finding physical address from virtual address, its a requirement
        that the virtual address must be aligned on page boundary for most system calls */
        Align the virtual address obtained on page boundary
        while(till last page in the chunk)
        {
                get the virtual address for a page;
                obtain physical address for the virtual address;
                /* calls like pdiag_dd_dma_setup() can be used here */
                /* If it cant be used, new system calls have to be implemented */ store the physical address in the physical array
                store the virtual address in the virtual array
        }
        sort() ;  /* sort the array */
}
```

FIG. 8

```
Algorithm    uninitialize_contiguous_mem_pool
Input        none
Output       none
{
             while(till last page in the chunk)
             {
                     get the virtual address for a page ;
                     unpin the memory
                     /* here calls like pdiag_dd_dma_complete can be used */
                     /* This call unpins and un-attaches the memory in the kernel */
             }
             free the malloced memory chunk
}
```

FIG. 9

```
Algorithm    get_contiguous_memory
Input        no of pages needed
Output       No of contigous pages obtained
             1 if no of pages needed not found
{
        current element = first element of the physical address array
        next element = second element of the physical address array
        pages obtained = 1 ;
        while(till last element of the physical array is checked)
        {
                if(next element == (current element + page size))
                {
                        /* The two pages are contiguous */
                        pages obtained ++ ;
                }
                if(pages obtained == no of pages needed)
                {
                        mark pages as used;
                        return (pages obtained );
                }
                increment current element and next element
        }
        return 1 ;
}
```

CONTIGUOUS PHYSICAL MEMORY ALLOCATION

FIELD OF THE INVENTION

The present invention relates to allocating contiguous physical memory in random-access memory.

BACKGROUND

The use of contiguous physical memory (that is, memory that comprises real (physical) addresses that are consecutive) is becoming increasingly infrequent in kernel architecture for computer systems. Kernel architects assume that hardware supports scatter-gather I/O, which is often correct.

However, many older hardware components do not support scatter-gather I/O, and some newer hardware components also do not support scatter-gather I/O. Various newer hardware device components do not support scatter-gather I/O for their buffer descriptor rings. One example is the Gigabit Ethernet/PCI network interface card, Tigon 2 ASIC, version 5 or 6, SX fibre connector IBM FRU 07L8918 produced by Alteon Websytems Inc (acquired by Nortel networks) of San Jose, Calif.

Operating systems provide APIs (application program interfaces) for kernel programming. In particular, operating systems provide APIs to allocate memory in the kernel virtual address space. An example is xmalloc ( ) provided by the AIX™ operating system. This API provides no guarantee that the physical memory allocated as a result of this API is contiguous.

Some operating systems provide APIs to allocate memory in the virtual address space with a guarantee that the physical memory is contiguous. An example is rmalloc ( ) in the AIX™ operating system. Memory allocated as a result of this command is pinned but not pageable. Use of APIs that provide contiguous physical memory (for example, rmalloc ( ) as noted directly above) is limited. Programmers writing kernel extensions, device drivers and other modules are generally not permitted to use APIs such as rmalloc ( ). Such APIs are generally used only by firmware programmers in certain circumstances. In this respect, the free pool of memory available using rmalloc ( ) is 16 MB and is fully used by firmware in most systems that use the AIX™ operating system, such as the IBM RS/6000 series systems.

For application (that is, user-mode) programming, standard APIs provided for memory allocation are malloc ( ) and realloc ( ). In both cases, the contiguity of the underlying physical memory is not guaranteed. Consequently, these calls are not suitable for use in cases in which contiguous physical memory is required.

In view of the above observations, a need clearly exists for an improved manner of allocating contiguous physical memory.

SUMMARY

Algorithms are described herein for providing physically contiguous memory from memory that is allocated without any guarantee whether the underlying contiguous physical memory is contiguous. These algorithms can be incorporated into operating system calls for allocating memory, to ensure that the memory allocated by these calls is physically contiguous.

Providing physically contiguous memory involves identifying contiguous pages of physical memory in one (relatively large-sized) chunk of allocated virtual memory, or multiple (relatively small-sized) chunks of allocated virtual memory. Such identified physical pages are contributed to a pool of contiguous physical memory for use as required.

If only a single chunk of virtual memory is allocated, no unused pages can be freed if at least some pages are used as contiguous pages. However, some unused pages can be freed to alternative uses if those chunks are not allocated with other pages that are contributed to a pool of contiguous physical memory for subsequent use. Any pages that are not contributed to the pool of contiguous physical memory can be freed from allocation for alternative uses.

Allocating only a single chunk of memory is simpler, but less efficient, while allocating multiple discrete chunks is more complicated, but can be more efficient by "wasting" less unused pages.

Allocating only a single relatively large-sized chunk of memory is simpler, results in more physical contiguous pages, but is less efficient, while allocating multiple discrete relatively small-sized chunks is more complicated, results in less physical contiguous pages, but can be more efficient by "wasting" less unused pages.

DETAILED DESCRIPTION

A method, a computer system and computer software are described herein in the context of an operating system for allocating physically contiguous memory. A particular implementation is described herein in relation to the AIX™ operating system, though implementations can also be provided for other operating systems.

First and second algorithms for allocating physically contiguous memory are each described in turn. Each algorithm has particular advantages, and an overview of both is provided below.

First Algorithm

Figure 1:
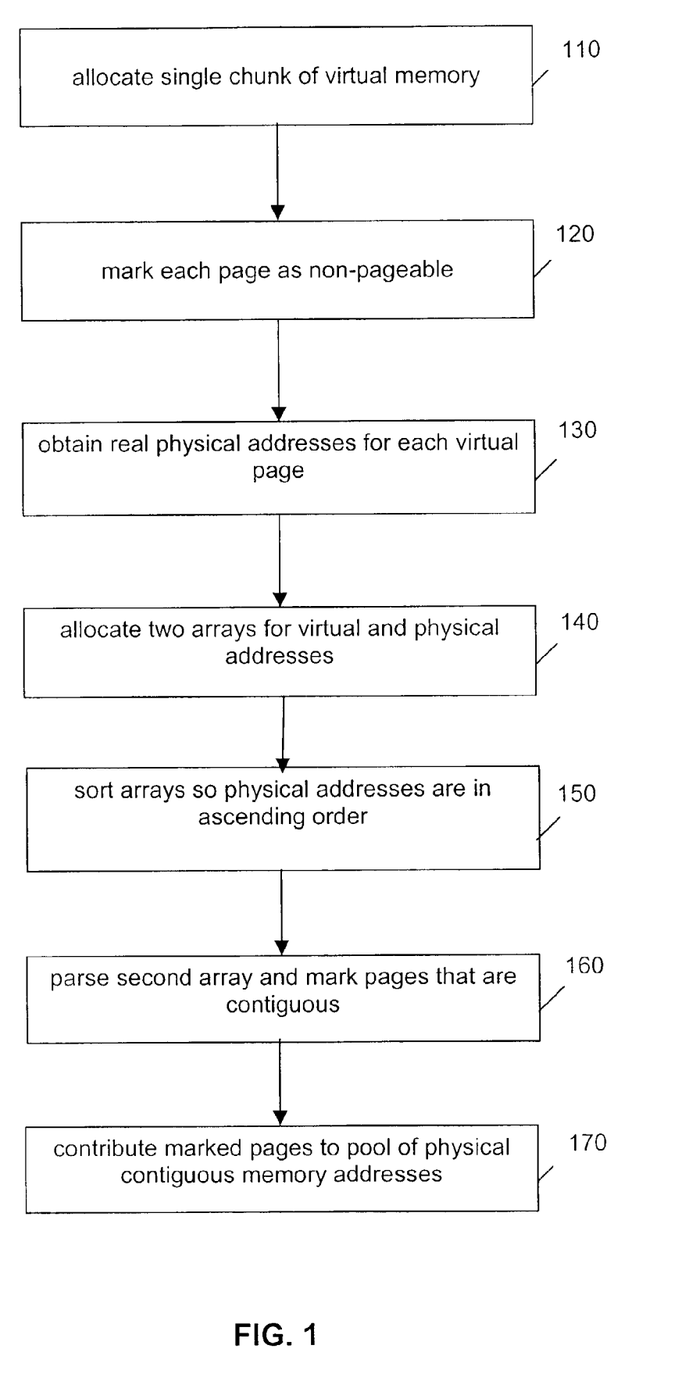
FIG. 1 is a flowchart of a first algorithm for allocating physically contiguous memory in a manner that involves only one chunk of virtual memory.

The steps in a first algorithm for allocating physically contiguous memory are described as follows in relation to FIGS. 1 to 3. The steps described directly below correspond with those indicated in the flowchart of FIG. 1.

| | |
|---|---|
| step 110 | Allocate a single, large chunk of memory in the virtual address space (malloc(), realloc() in user mode, xmalloc() in kernel mode). |
| step 120 | Mark each page in the chunk obtained above as non-pageable. This means the pages is never swapped out and its physical address remains persistent (xmempin () in kernel mode). |
| step 130 | Obtain real physical address of each virtual page in the chunk. |
| step 140 | Allocate two arrays (data structure) with the number of elements equal to number of pages in the chunk. The first array holds virtual address of each page while the second array holds the physical address for the corresponding page. |
| step 150 | Sort the arrays in such a way that the elements in the second array are in ascending order. While sorting, care must be taken so that the 1:1 mappings between the first and second array elements remain intact. Consequently, the second array has elements sorted in ascending order whereas the first array has elements in no particular order. |
| step 160 | Parse through the second array and mark the pages that are contiguous. |
| step 170 | These marked pages then contribute to the physically contiguous pool. |

Figure 2:
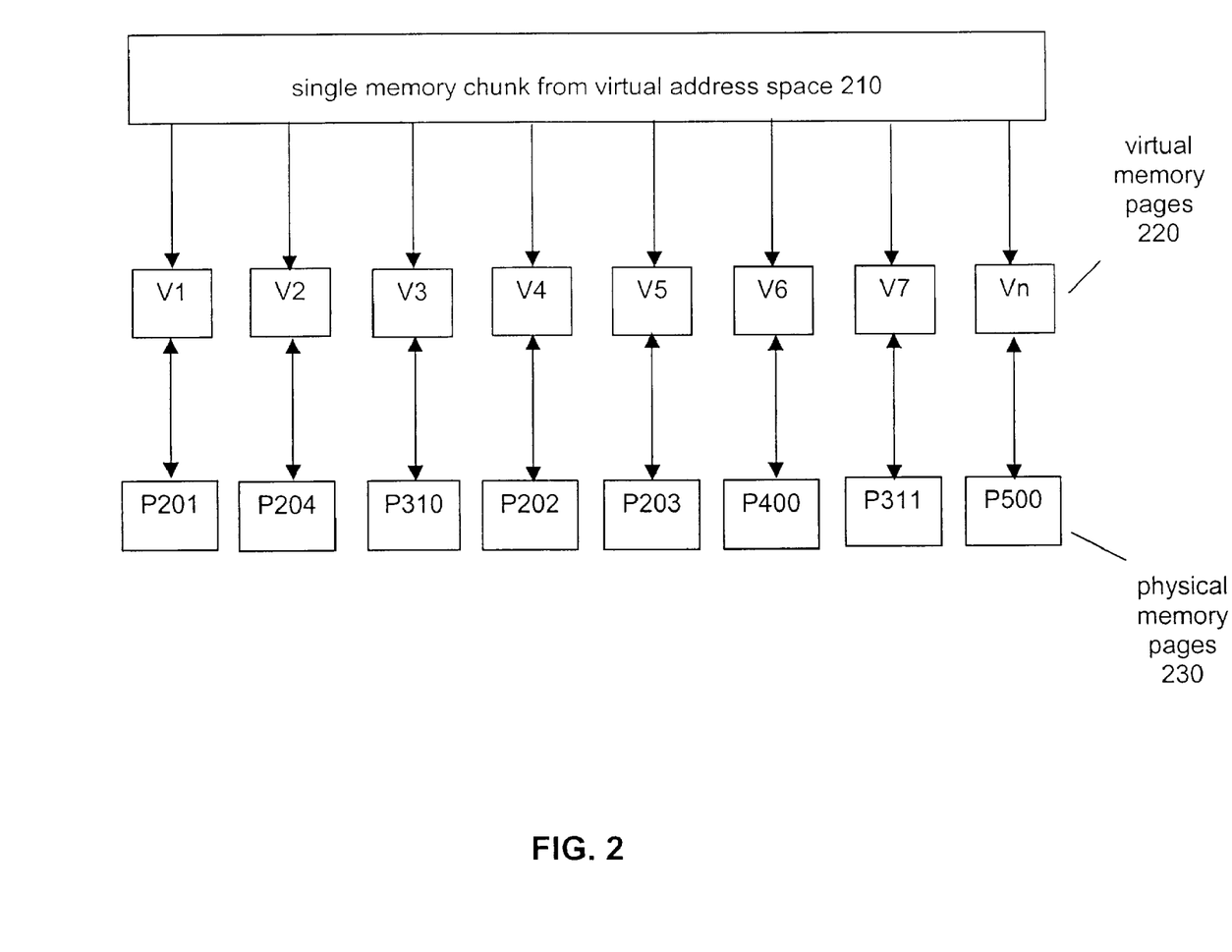
FIGS. 2 and 3 are schematic representations of the process involved in allocating physically contiguous memory according to the first algorithm of FIG. 1.

FIG. 2 schematically represents the allocation of a single chunk of memory 210. This single chunk 210 comprises virtual memory pages 220 V1 . . . Vn. In turn, these virtual memory pages 220 correspond with respective physical memory pages 230 P201 . . . P500. There is no particular correlation between the virtual memory pages 220 and the physical memory pages 230. Indicative physical memory addresses P201, P204 etc are provided as examples, as represented in FIG. 2.

Figure 3:
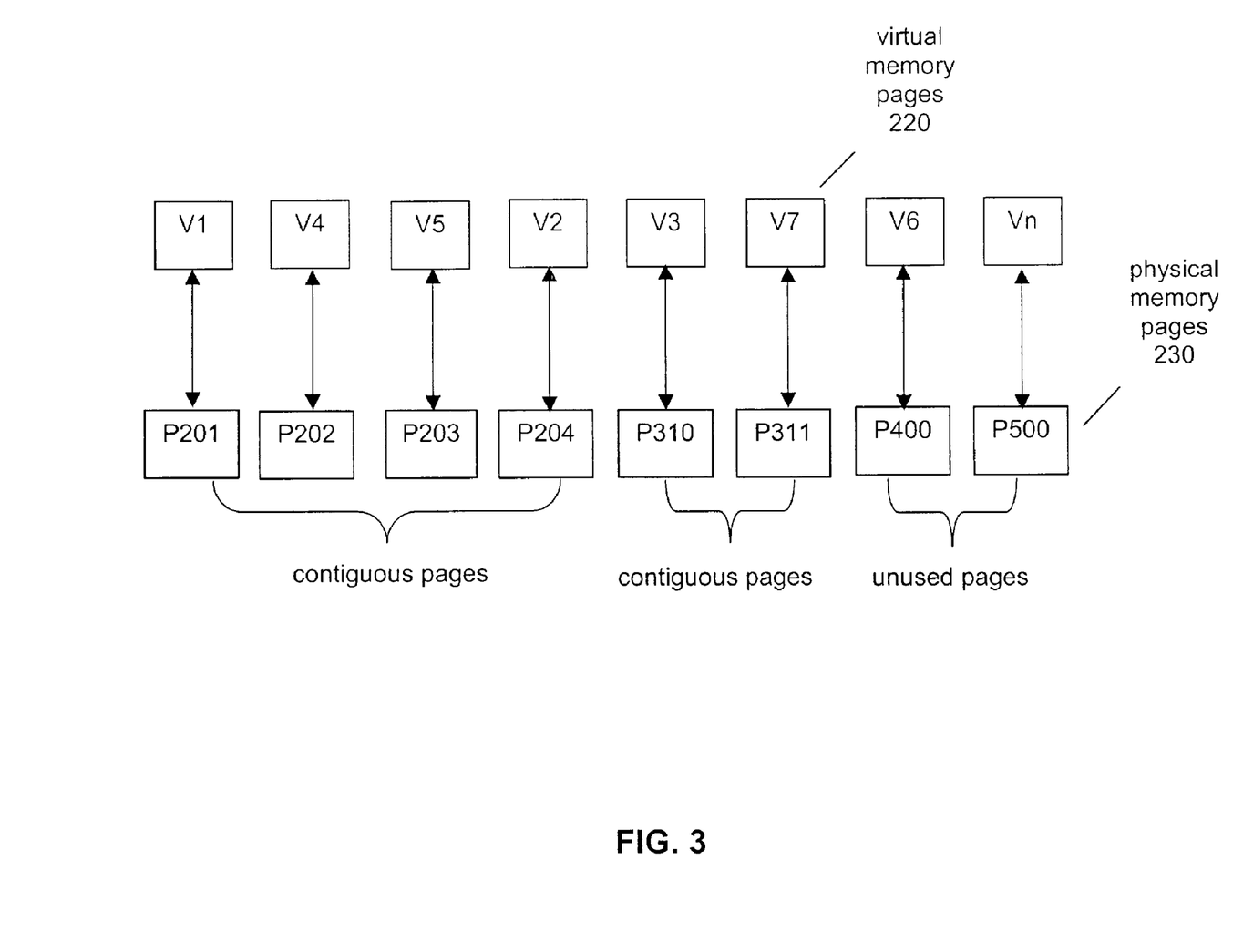

FIG. 3 corresponds with FIG. 2 and schematically represents the virtual memory pages 220 and physical memory pages 230 after sorting. In this case, two sets of contiguous physical memory pages can be identified, as indicated in FIG. 3. These contiguous physical memory pages comprise pages with addresses: P201, P202, P203, P204; and P310 and P311.

These two sets of pages of physical memory 230 are contributed to a pool of contiguous physical memory for use as required. Unused physical memory pages are identified as having addresses P400 and P500, but cannot be freed as the memory chunk 210 contributes a number of pages to the two sets of contiguous physical memory noted above.

Second Algorithm

Figure 4:
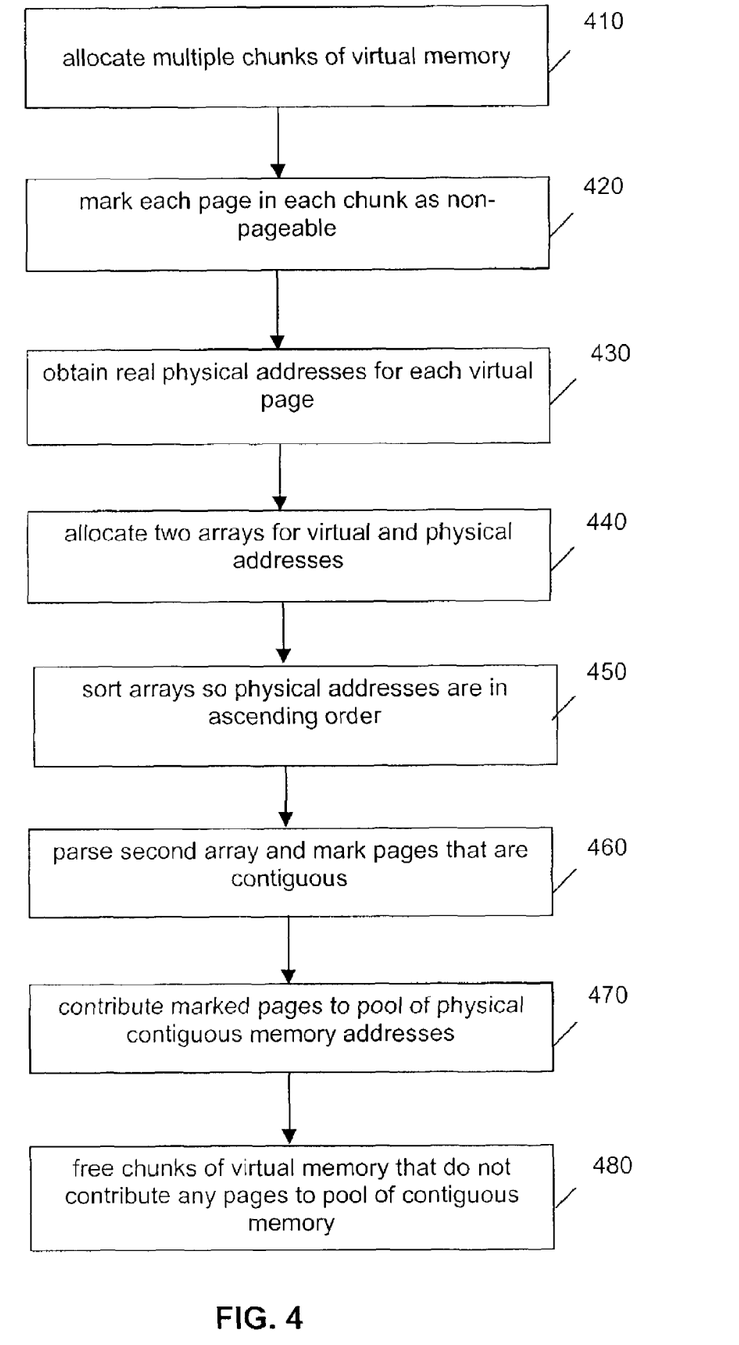
FIG. 4 is a flowchart of a second algorithm for allocating physically contiguous memory in a manner that involves several chunks of virtual memory.

The steps of a second algorithm for allocating physically contiguous memory are described as follows with reference to FIGS. 4 to 6. The steps described directly below correspond with those indicated in the flowchart of FIG. 4.

| | |
|---|---|
| step 410 | Allocate small chunks of memory in the virtual address space (malloc(), realloc() in user mode, xmalloc() in kernel mode). These chunks could be 10 or 100 or more pages and could be programmable. Allocate several of such chunks. Note that in this method the contiguity gets reduced and hence more number of pages is needed to be allocated. |
| step 420 | Mark each page in each of the chunk obtained above as non-pageable. This means the pages are never swapped out and its physical address remains persistent. (xmempin () in kernel mode). |
| step 430 | Obtain real physical address of each virtual page in each of the chunk. |
| step 440 | Allocate two arrays (data structure) with no of elements equal to total number of pages in the entire chunk. The first array holds virtual address of each page while the second array holds the physical address for the corresponding page. |
| step 450 | Sort the arrays in such a way that the elements in the second array are in ascending order. While sorting care must be taken so that the 1:1 mappings between the first and second array elements remains intact. As a result of this the second array has elements sorted in ascending order whereas the first array has elements in no particular order. |
| step 460 | Parse through the second array and mark the pages that are contiguous |
| step 470 | These marked pages then contribute to the physically contiguous pool. |
| step 480 | All chunks allocated in step 1 are examined. If any of the chunk does not contribute a single page to the contiguous memory pool, it is freed (using free() or xmemfree()) |

Figure 5:
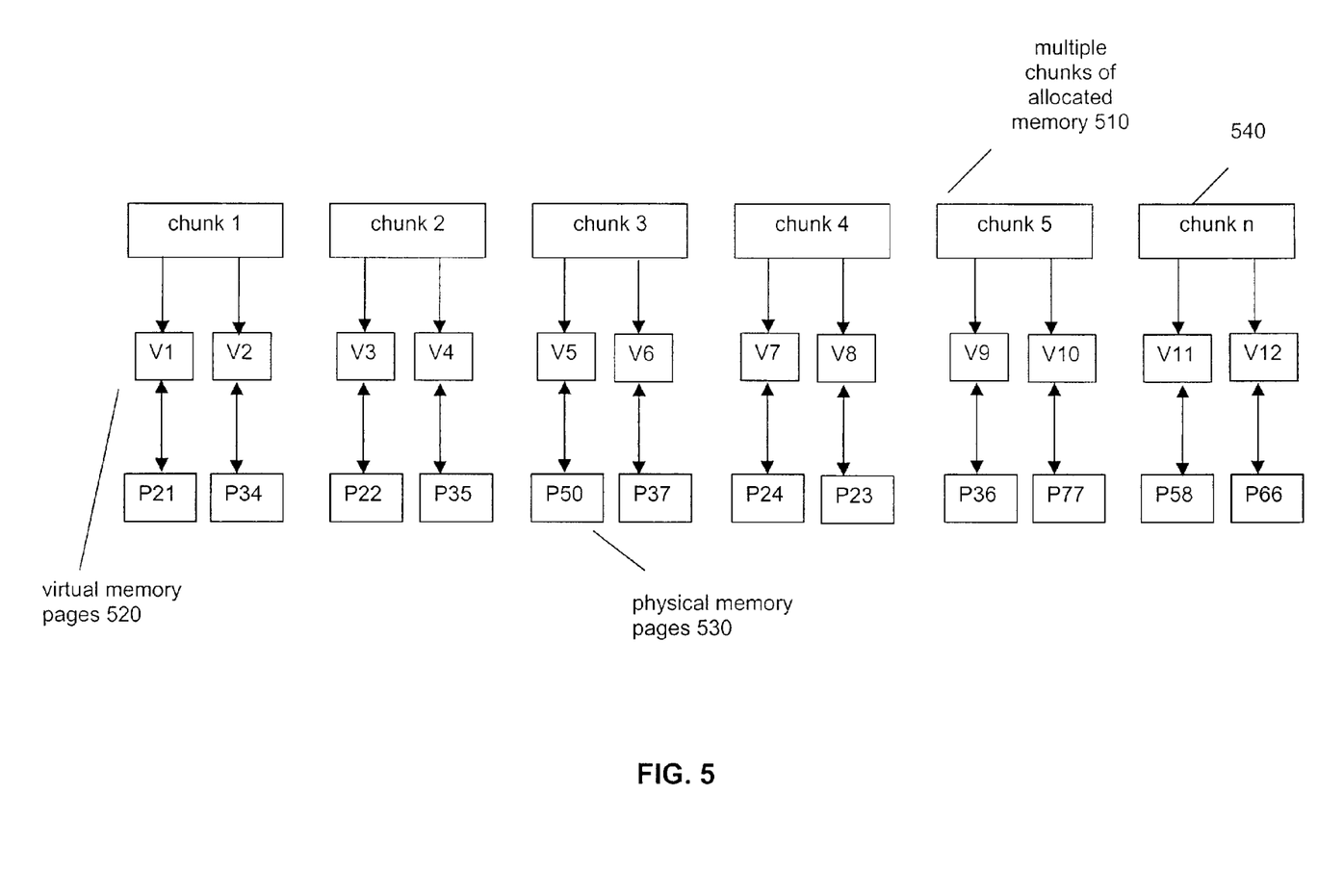
FIGS. 5 and 6 are schematic representations of the process involved allocating physically contiguous memory according to the second algorithm of FIG. 4.

FIG. 5 schematically represents the allocation of n chunks of memory 510. These chunks 510 comprises virtual memory pages 520 V1 . . . V12 as represented in FIG. 5. In turn, these virtual memory pages 520 correspond with respective physical memory pages 530 P21 . . . P66. There is no particular correlation between the virtual memory pages 520 and the physical memory pages 530. Indicative physical memory addresses P21, P34 etc are provided as examples, as represented in FIG. 5.

Figure 6:
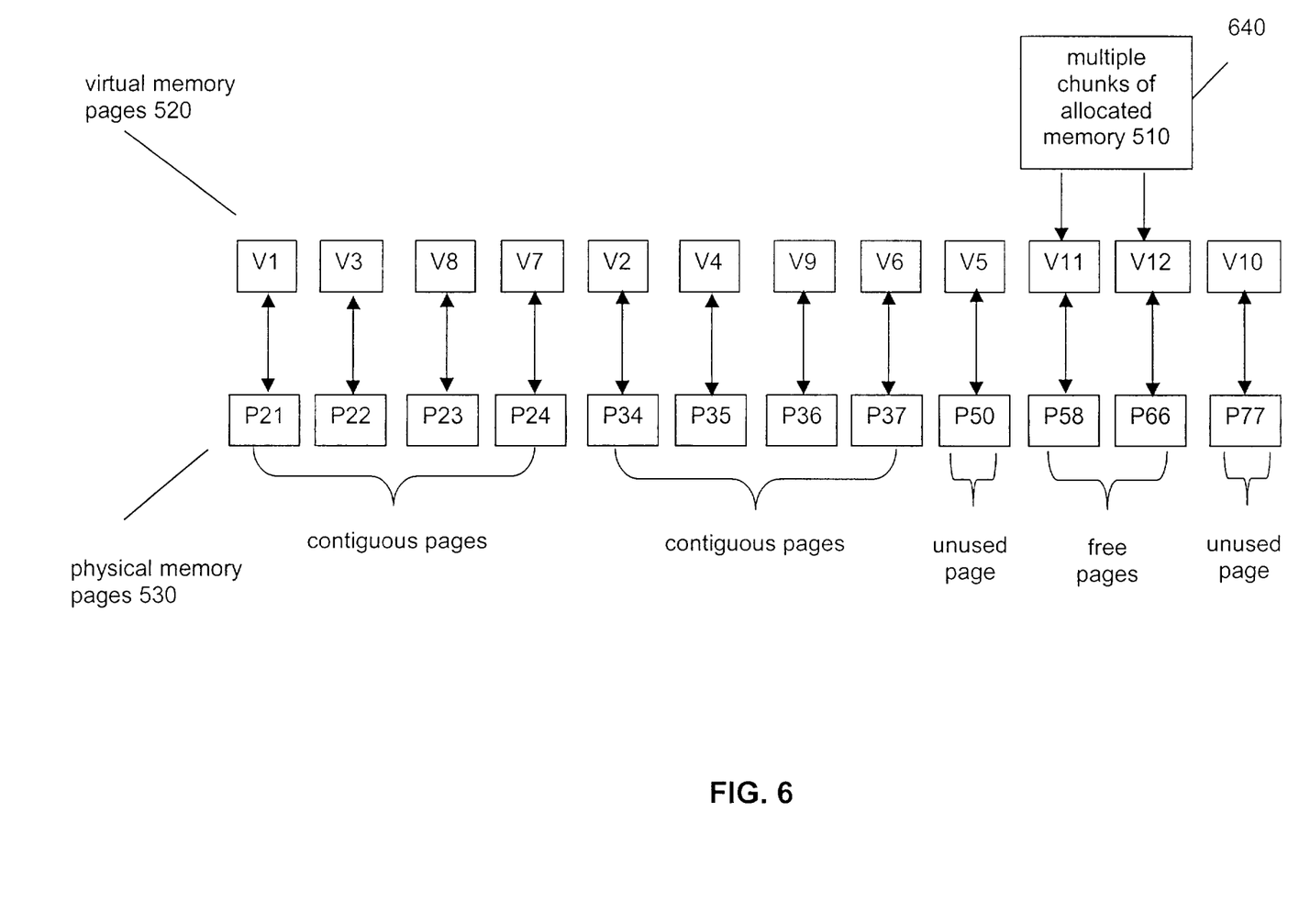

FIG. 6 corresponds with FIG. 5 and schematically represents the virtual memory pages 520 and physical memory pages 530 after sorting. In this case, two sets of contiguous physical memory pages can be identified, as indicated in FIG. 6. These contiguous physical memory pages comprise the following two sets of physical memory pages: P21, P22, P23, P24; and P34, P35, P36, P37.

Two unused pages are identified as having physical memory addresses: P50 and P77. Two used pages are also able to be freed as these pages are not part of an allocated memory chunk that shares pages that are part of a set of contiguous physical memory pages. These pages are: P58 and P66 are allocated in a single chunk as virtual pages V11 and V12. These pages P58 and P66 are associated with chunk n 640 m as represented in FIG. 6.

Implementation of Algorithm

Either the first or second algorithm can be used in either of the following ways. In one implementation, the algorithm can be included in a user mode library. Alternatively, the algorithm can be included in the malloc ( ) code, so that user mode applications can take advantage of the revised functionality of the malloc ( ) code.

This algorithm can be implemented in a kernel extension to provide facilities in the kernel. Pseudocode is presented in FIGS. 7 to 10 as an example implementation of the described algorithm.

Figure 7:
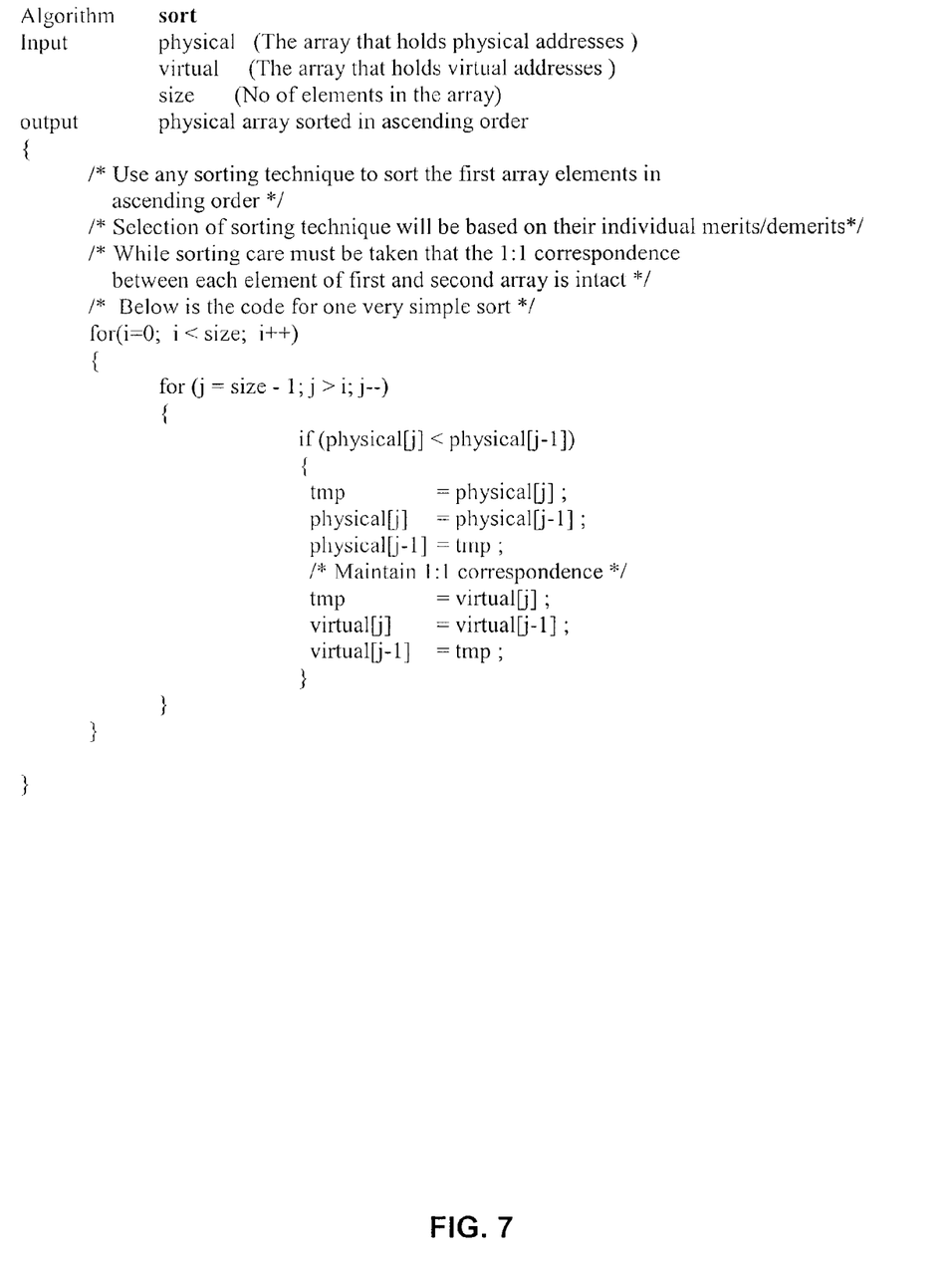
FIGS. 7 to 10 are pseudocode fragments that can be used to implement the algorithms described with reference to FIGS. 1 and 6.
Figure 8:
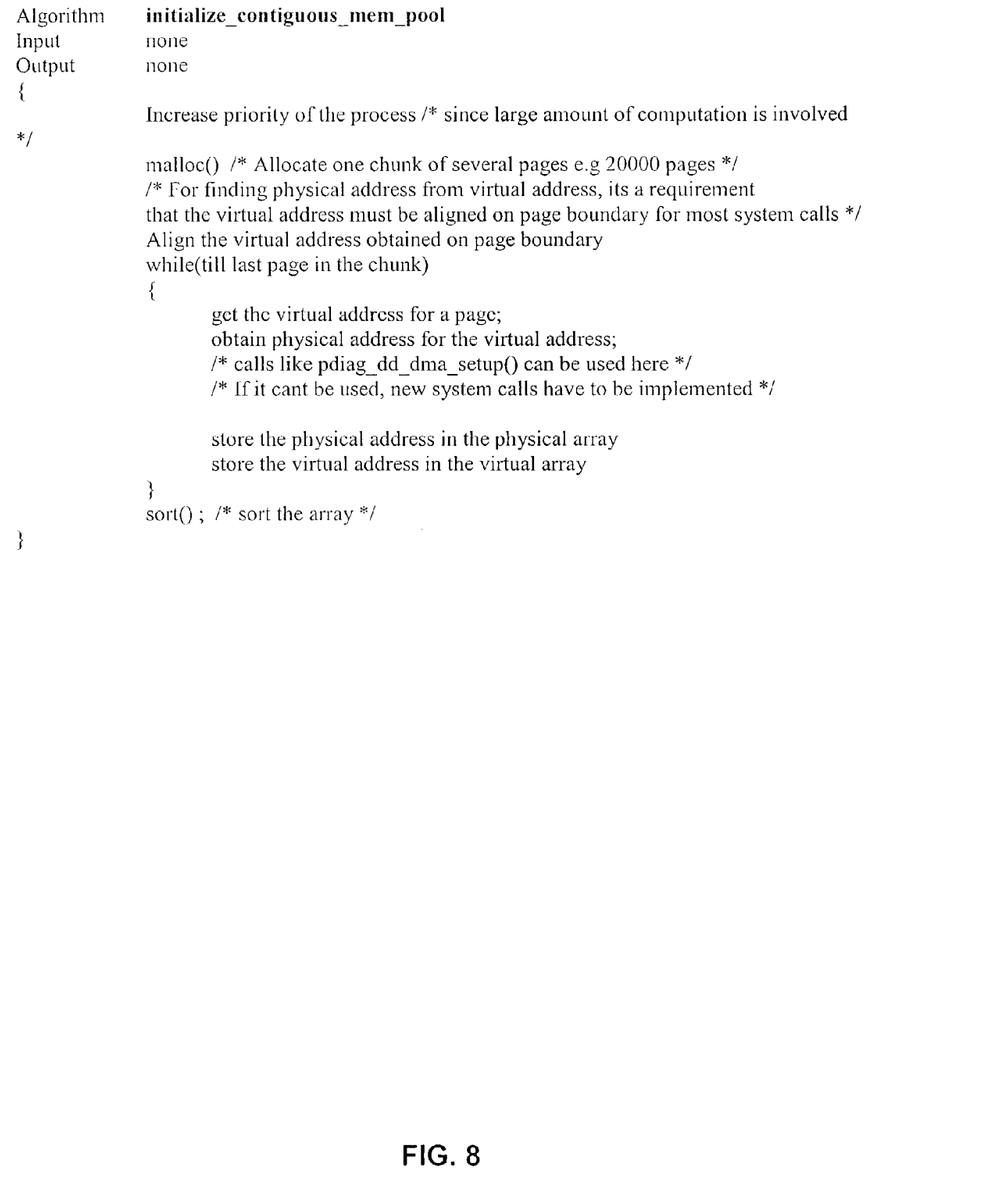
Figure 9:
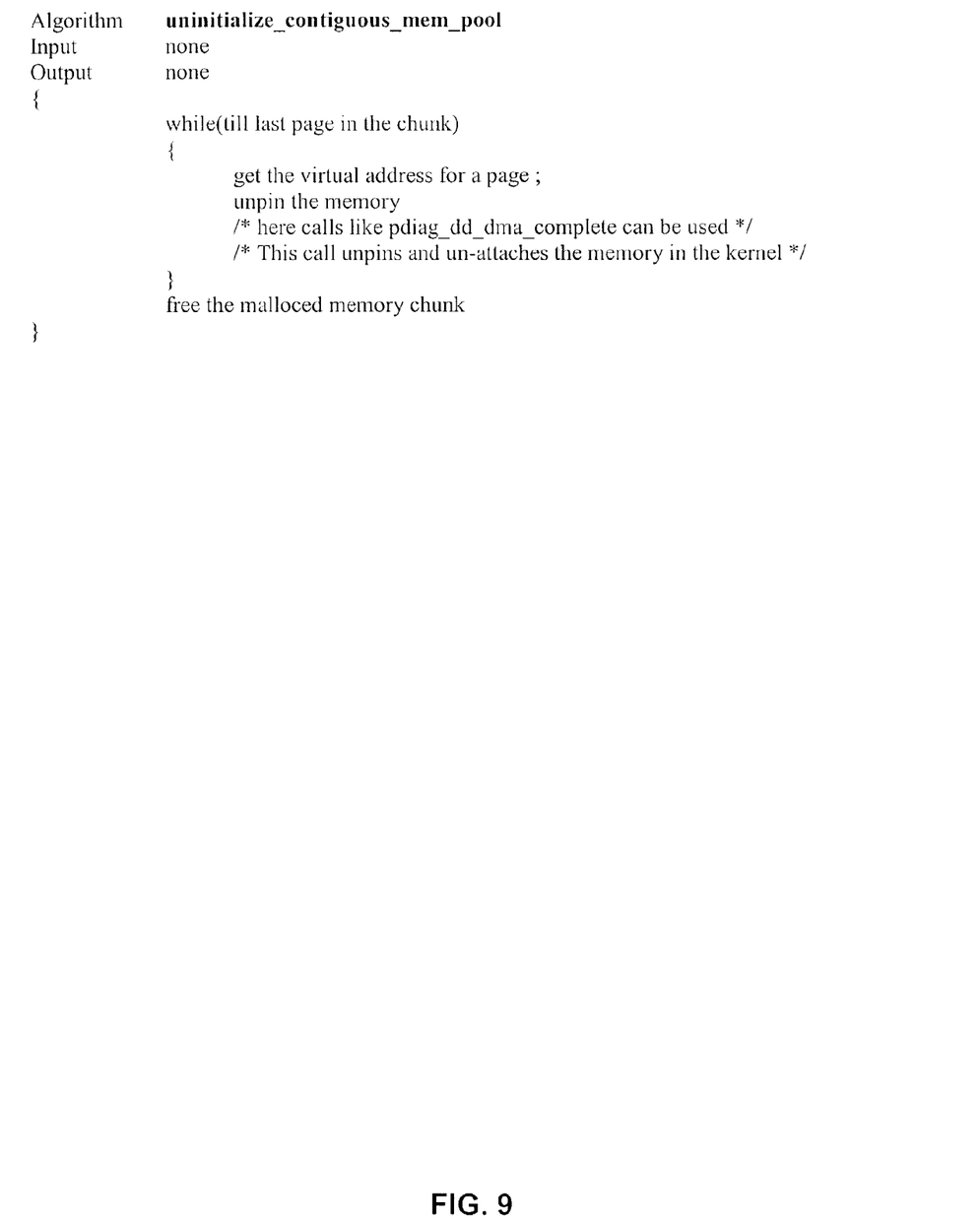
Figure 10:
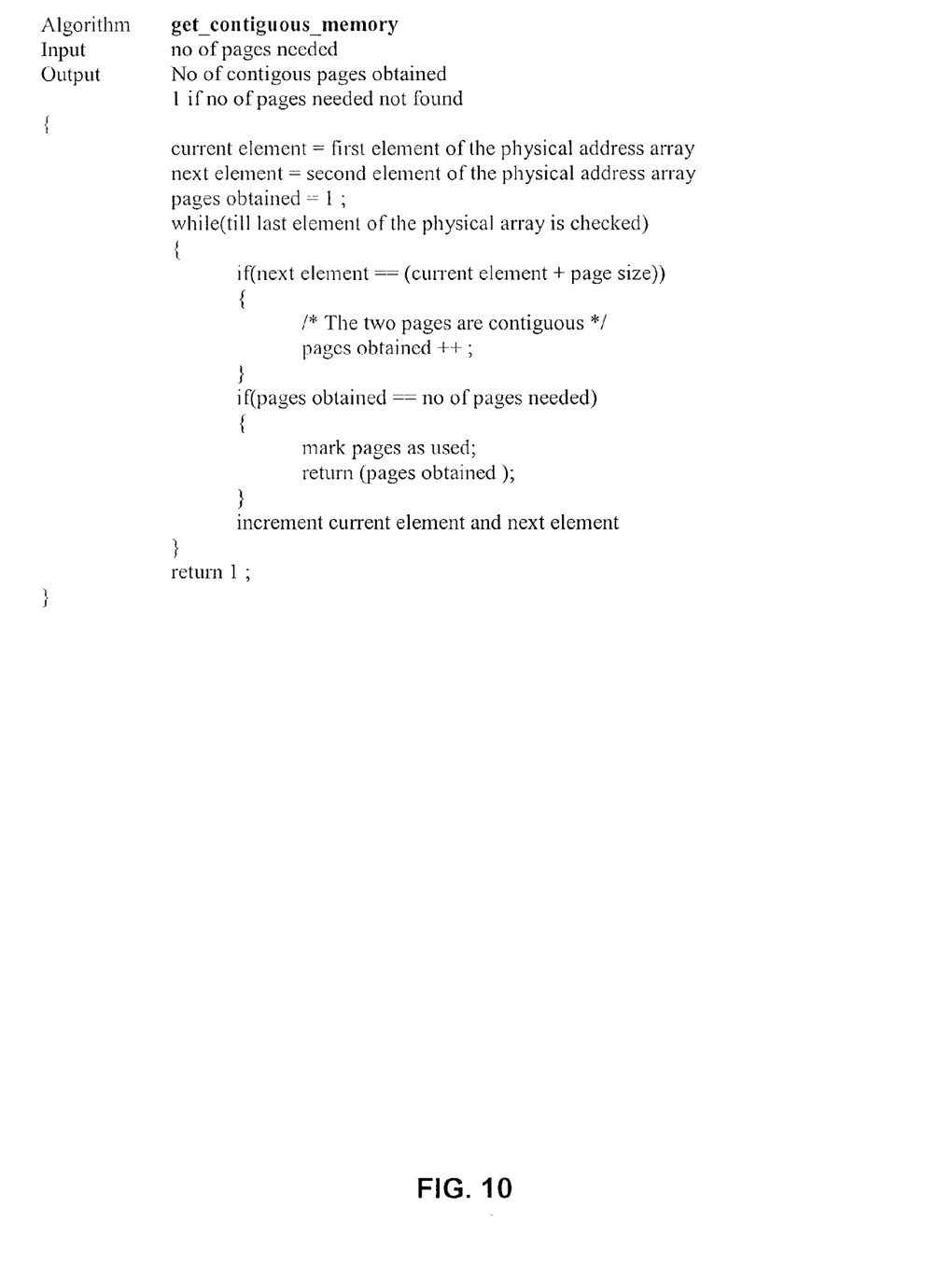

FIG. 7 presents pseudocode for sorting array elements of corresponding physical and virtual memory addresses FIG. 8 presents pseudocode for initiating a pool of contiguous memory. FIG. 9 presents pseudocode for uninitializing the pool of contiguous memory. FIG. 10 presents pseudocode for obtaining a desired number of pages of contiguous memory.

These pseudocode fragments of FIGS. 7 to 10 can be appropriately used in combination to implement the described algorithm.

The pseudocode fragments of FIGS. 7 to 10 represents one way of implementing the algorithm. There can be many different efficient coding techniques and data structures used for implementing the described algorithm. The code presented above is an implementation for user-mode operation. One important tip for implementing this algorithm in user-mode is as follows.

The pseudocode can use calls exported by "pdiagex" (portable diagnostic kernel extension). This is a general purpose kernel extension available in the AIX™ operating system for diagnosis of programming errors. The code uses two calls ((a) pdiag_dd_dma_setup( ) (b) pdiag_dd_dma_complete( )) for obtaining the physical address by remaining in the user mode. If the extension is not used then two system calls with similar capabilities should be used instead.

Overview of First and Second Algorithms

This first algorithm presented above results in a large amount of memory wastage. Not all pages contribute to the contiguous memory pool, and unused pages cannot be freed. Since all the pages are allocated using a single malloc( ) call, the kernel memory allocation functions are exercised at closed vicinity and hence probability of obtained contiguous physical memory is extremely high.

When small-sized chunks of virtual memory are allocated, pinned and physical address is obtained, each of these operations does not happen in very quick sucession for each chunk. In between each of these operations, many other kernel services related to memory allocation, memory and so on are cleanup executed. Hence, the physical addresses tend to be dispersed (that is, distributed throughout a range of physical addresses). By contrast, when one large-sized chunk is used, the above-noted operations occur in quick succession, thereby reducing the chances of dispersed (that is, non-contiguous) physical addresses.

The second algorithm is particularly advantageous if efficient use of resources is a priority over the amount of physical contiguous memory required. The second algorithm uses resources more efficiently and frees unwanted memory. However, the total amount of contiguous memory obtained is less than that obtained using the first algorithm.

The programming involved in implementing the first algorithm is relatively simple. The programming involved in the second algorithm is more complicated than that involved in the first algorithm due to the use of data structures not used in the first algorithm.

Computer Hardware and Software

Figure 11:
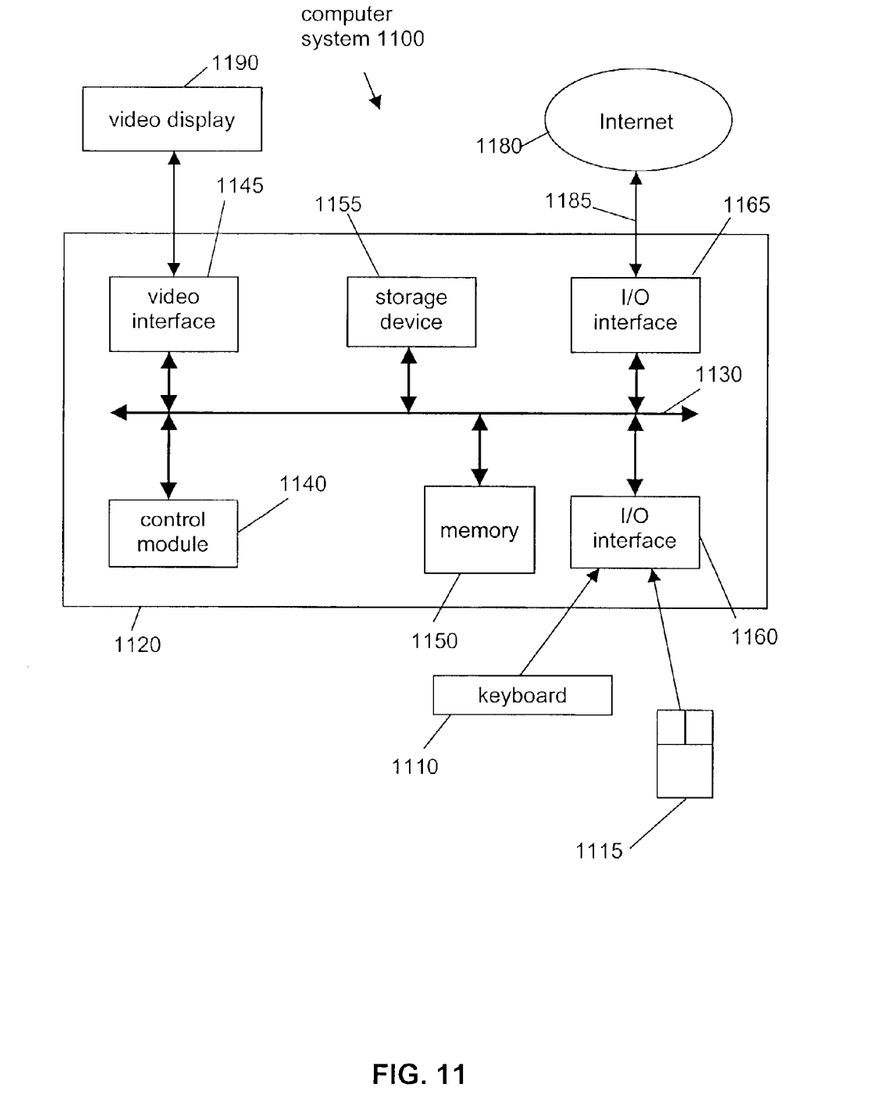
FIG. 11 is a schematic representation of a computer system in which the techniques described with reference to FIGS. 1 to 10 are performed.

FIG. 11 is a schematic representation of a computer system 1100 that can be used to perform steps in a process that implement the techniques described herein. The computer system 1100 is provided for executing computer software that is programmed to assist in performing the described techniques. This computer software executes under a suitable operating system installed on the computer system 1100.

The computer software involves a set of programmed logic instructions that are able to be interpreted by the computer system 1100 for instructing the computer system 1100 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 1100 include: a computer 1120, input devices 1110, 1115 and video display 1190. The computer 1120 includes: processor 1140, memory module 1150, input/output (I/O) interfaces 1160, 1165, video interface 1145, and storage device 1155.

The processor 1140 is a central processing unit (CPU) that executes the operating system and the computer software executing under the operating system. The memory module 1150 includes random access memory (RAM) and read-only memory (ROM), and is used under direction of the processor 1140.

The video interface 1145 is connected to video display 1190 and provides video signals for display on the video display 1190. User input to operate the computer 1120 is provided from input devices 1110, 1115 consisting of keyboard 1110 and mouse 1115. The storage device 1155 can include a disk drive or any other suitable non-volatile storage medium.

Each of the components of the computer 1120 is connected to a bus 1130 that includes data, address, and control buses, to allow these components to communicate with each other via the bus 1130.

The computer system 1100 can be connected to one or more other similar computers via a input/output (I/O) interface 1165 using a communication channel 1185 to a network 1180, represented as the Internet.

The computer software can be provided as a computer program product recorded on a portable storage medium. In this case, the computer software is accessed by the computer system 1100 from the storage device 1155. Alternatively, the computer software can be accessed directly from the network 1180 by the computer 1120. In either case, a user can interact with the computer systm 1100 using the keyboard 1110 and mouse 1115 to operate the computer software executing on the computer 1120.

The computer system 1100 is described only as an example for illustrative purposes. Other configurations or types of computer systems can be equally well used to implement the described techniques.

CONCLUSION

The techniques described herein can be used to provide a relatively large pool of contiguous memory, enough to use data buffers larger than 4K. The size of a page in a typical operating system is 4K and, normally, one cannot cross this 4K limit for data buffers.

The described techniques work well for "hot-plugged" PCI (peripheral connection interface) components and do not depend on firmware initialization, or do not need to reboot upon installation. The described techniques are also useful for small-scale memory requirements without using rmalloc ( ) or analogous scarcely available resources.

A pool of contiguous memory is available for application and kernel programmers. The amount of contiguous physical memory that is available is tunable, and can be increased or decreased by appropriate resource management. A minimum pool of memory can be provided by appropriately managing resources. No extra functionality is required from hardware devices, and no changes in hardware memory mappings are required. There is no locking of resources. Also, there is no need to "hack" the operating system firmware to allocate physical memory, or make changes in the kernel.

Resources are not permanently blocked. Whenever required, memory and resources can be unloaded to be made available for general use.

The amount of contiguous physical memory available in any particular instance depends on the size of memory installed in a computer system. Each time the algorithm is initialized, the algorithm cannot determine in advance the amount of physically contiguous that is available. Both algorithms described herein result in some memory wastage. The second algorithm reduces the extent of this memory wastage, but at the expense of reducing the total amount of contiguous memory available.

Though the techniques and arrangements described herein relate to the AIX™ operating system, these techniques are arrangements are also applicable to other Unix-based operating systems. Implementations are also possible in non-Unix operating systems such as Windows NT. The described algorithm does not have any particular operating system dependency.

Various alterations and modifications can be made to the techniques and arrangements described herein, as would be apparent to one skilled in the relevant art.

I claim:

1. A method for providing memory addresses that are physically contiguous, the method comprising the steps of:
   allocating at least one portion of virtual memory address space that comprises one or more discrete virtual pages;
   obtaining physical memory addresses for each of said pages of said at least one portion;
   determining which of said pages have physical memory addresses that are contiguous; and
   assigning said determined virtual memory addresses of said determined pages a pool of contiguous physical memory for subsequent use.

2. The method as claimed in claim 1, further comprising the step of: assigning each of said pages of said at least one portion of virtual memory as non-pageable.

3. The method as claimed in claim 1, further comprising the step of: providing two arrays that have as many elements as the total number of said pages in said at least one portion of virtual memory.

4. The method as claimed in claim 3, wherein said two arrays comprise a first array that holds the virtual addresses of each of said pages, and a second array that holds the corresponding physical addresses of each of said pages.

5. The method as claimed in claim 1, further comprising the step of: sorting the contents of said two arrays so that the contents of said second array are in ascending order of physical address.

6. The method as claimed in claim 5, wherein said step of sorting maintains a 1:1 relationship between the respective elements of said first array and said second array.

7. The method as claimed in claim 1, further comprising the step of: marking the elements of said second array that form contiguous physical memory addresses.

8. The method as claimed in claim 1, wherein only one portion of virtual memory is allocated.

9. The method as claimed in claim 1, wherein a plurality of virtual memory portions are allocated.

10. The method as claimed in claim 8, further comprising the step of: freeing any one of said allocated portions of virtual memory that does not have at least one page assigned to said pool of contiguous physical memory.

11. Computer software for providing memory addresses that are physically contiguous, the computer software recorded on a medium and able to be executed by a computer system capable of interpreting the computer software, the computer software comprising:
    code means for allocating at least one portion of virtual memory addresses of said determined pages space that comprises one or more discrete virtual pages;
    code means for obtaining physical memory addresses for each of said pages of said at least one portion;
    code means for determining which of said pages have physical memory addresses that are contiguous; and
    code means for assigning said determined virtual memory addresses to a pool of contiguous physical memory for subsequent use.

12. A computer system, for providing memory addresses that are physically contiguous, the computer system executing computer software, comprising:
    means for allocating at least one portion of virtual memory address space that comprises one or more discrete virtual pages;
    means for obtaining physical memory addresses for each of said pages of said at least one portion;
    means for determining which of said pages have physical memory addresses that are contiguous; and
    means for assigning said determined virtual memory addresses of said to a pool determined pages of contiguous physical memory for subsequent use.

* * * * *